T. WHYTE.
WAGON-BRAKES.
No. 194,753. Patented Aug. 28, 1877.
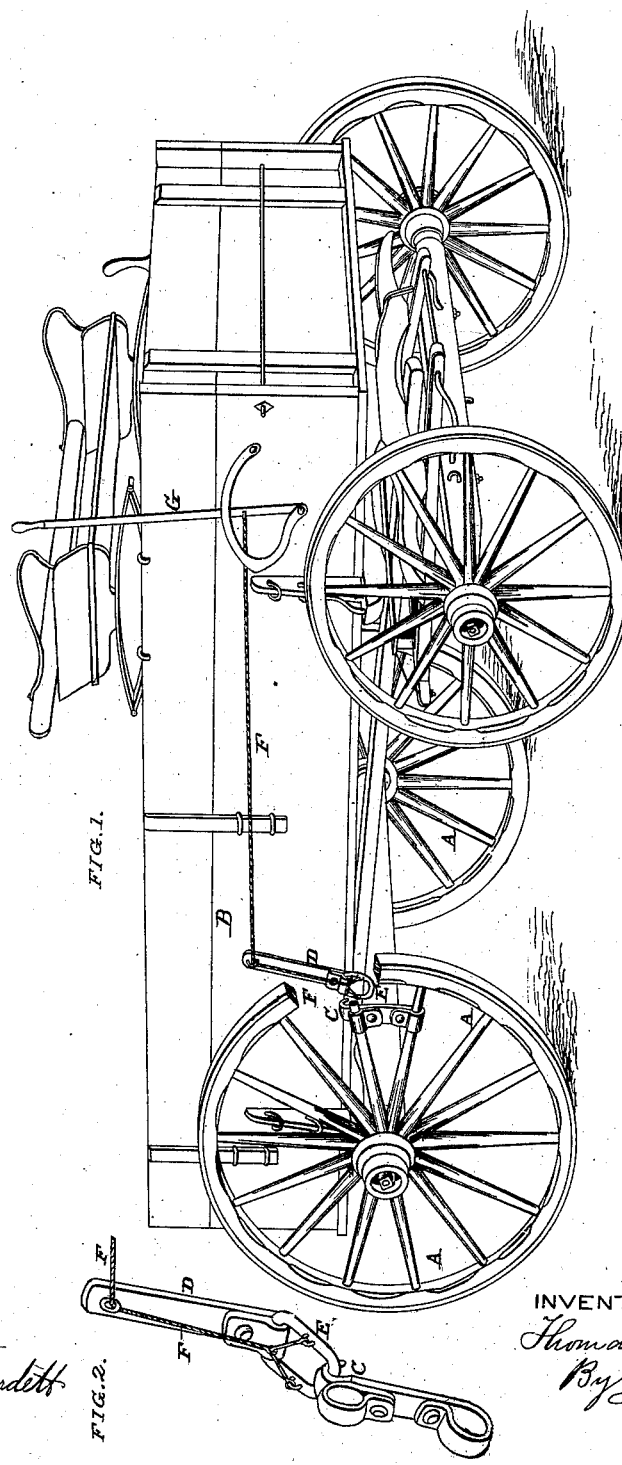
ATTEST:
INVENTOR:

UNITED STATES PATENT OFFICE.

THOMAS WHYTE, OF ST. LOUIS, MISSOURI.

IMPROVEMENT IN WAGON-BRAKES.

Specification forming part of Letters Patent No. 194,753, dated August 28, 1877; application filed May 19, 1877.

*To all whom it may concern:*

Be it known that I, THOMAS WHYTE, of the city of St. Louis, in the State of Missouri, have invented a certain new and useful Improvement in Wagon-Brakes, of which the following is a full, clear, and exact description, reference being had to the accompanying drawings, making part of this specification.

My improvement consists in attaching to the hind wheel of the wagon a hook, which projects on the inner side, and connecting to the body of the wagon a link or loop, which is capable of being moved outward, so as to engage the hook, and prevent the rotation of the wheel.

The members of the brake may be reversed, the link or loop being fixed to the wheel, and the hook being hinged to the body.

In the drawings, Figure 1 is a perspective view of a wagon with my improvement applied thereto, part of one of the wheels being represented as broken away to show the hook. Fig. 2 is a perspective view of the brake-irons.

A A are hind wheels, and B is the body of the wagon. C is a metal hook, which is attached to the wheel in any suitable manner, said hook projecting from the inner side of the wheel. D is a bracket attached to the body, and serving as a hinge-connection for the link E.

The link E ordinarily hangs in a vertical position, and is out of the course of the hook C upon the wheel. In applying the brake, the link is thrown upward and outward by a cord or chain or rod, F, and lever G, or any other suitable means, so as to bring said link into the course of the hook C as the wheel rotates, and then the hook engages with the link, and the rotation of the wheel is stopped. On arriving at the bottom of the hill the wagon is stopped, and, on a slight retrograde rotation of the wheel, either by backing the wagon or otherwise, the link falls off the hook C.

As a modification, it is obvious that the link E may be fixed rigidly to the wheel, and the hook C hinged to the body in such a manner as to be capable of being thrown out so as to engage the link.

The wagon may have a lock or brake apparatus upon one side only, or may be supplied with one upon each side, so that either or both wheels may be locked.

I claim as my invention—

The improved wagon-brake consisting of a hook, C, and link E, having cord or chain F attached thereto, bracket D, and lever G, said hook adapted to engage with said link, in the manner substantially as and for the purpose set forth.

THOMAS WHYTE.

Witnesses:
    SAML. KNIGHT,
    CHAS. HALL.